US005409989A

United States Patent [19]

Ito et al.

[11] Patent Number: 5,409,989

[45] Date of Patent: Apr. 25, 1995

[54] RESIN COMPOSITION FOR TONERS

[75] Inventors: Hirokazu Ito; Masahiro Ito; Keiji Yoshida, all of Nagoya; Syuji Takahiro, Kasugai; Motoshi Inagaki, Aichi, all of Japan

[73] Assignee: Mitsubishi Rayon Co., Ltd., Tokyo, Japan

[21] Appl. No.: 173,475

[22] Filed: Dec. 27, 1993

Related U.S. Application Data

[63] Continuation of Ser. No. 12,798, Feb. 2, 1993, abandoned, which is a continuation of Ser. No. 718,761, Jun. 21, 1991, abandoned.

[30] Foreign Application Priority Data

| | | | |
|---|---|---|---|
| Jun. 21, 1990 | [JP] | Japan | 2-163118 |
| Jun. 22, 1990 | [JP] | Japan | 2-165191 |
| Jun. 7, 1991 | [JP] | Japan | 3-163724 |

[51] Int. Cl.$^6$ ...................... C08G 63/195; G03G 9/08

[52] U.S. Cl. ...................................... 525/41; 528/103; 528/176; 528/190; 528/192; 528/194; 528/272; 528/298; 528/300; 528/303; 528/308; 528/308.6; 525/10; 525/165; 525/173; 525/437; 525/445; 430/120

[58] Field of Search ............... 528/103, 176, 190, 192, 528/194, 272, 298, 300, 303, 308, 308.6; 525/10, 41, 165, 437, 173, 445; 430/120

[56] References Cited

U.S. PATENT DOCUMENTS

| | | | |
|---|---|---|---|
| 4,110,187 | 8/1978 | Sloan et al. . | |
| 4,557,991 | 12/1985 | Takagiwa et al. . | |
| 4,845,006 | 7/1989 | Matsubara et al. | 430/99 |

FOREIGN PATENT DOCUMENTS

| | | |
|---|---|---|
| 312691 | 4/1980 | European Pat. Off. . |
| 3411103 | 9/1984 | Germany . |

OTHER PUBLICATIONS

*Pat. Abst. of Japan,* vol. 5, No. 191 (P-92) (863) 5 Dec. 1981 & JP-A-56 116 043, 11 Sep. 1981.

*Pat. Abst. of Japan,* vol. 7, No. 206 (P-222) (1351) 10 Sep. 1983 & JP-A-58 102 246 17 Jun. 1983.

*Pt. Abst. of Japan,* vol. 6, No. 137 (P-130) (1015) 24 Jul. 1982 & JP-A-57 060 339 12 Apr. 1982.

*Angewandte Makro. Chemie,* vol. 165, No. 2708, Jan. 1989, pp. 125-131.

*Primary Examiner*—Samuel A. Acquah

*Attorney, Agent, or Firm*—Oblon, Spivak, McClelland, Maier & Neustadt

[57] ABSTRACT

A resin composition for toners, composed essentially of a suspension polymerizate of:

(a) 5 to 40% by weight per total polymer of a polyester comprising at least one aromatic diol component an at least one aliphatic diol component, and having a weight average molecular weight of 3,000 to 30,000, an acid value of 0.5 to 10 mgKOH/g, and an OH value of 10 to 60 mgKOH/g;

(b) 60 to 95% by weight per total polymer of a vinyl monomer; and (c) 0.1 to 1.0% by weight per total polymer of a divinyl monomer, wherein said suspension polymerizate has a glass transition temperature of 40° to 70° C., an acid value of 0.1 to 10 mgKOH/g, and a softening temperature of 100° to 160° C.

18 Claims, No Drawings

RESIN COMPOSITION FOR TONERS

This application is a continuation of application Ser. No. 08/012,798, filed on Feb. 2, 1993, now abandoned, which is a continuation of application Ser. No. 07/718,761, filed on Jun. 21, 1991, now abandoned.

BACKGROUND OF THE INVENTION

1. Field of the Invention

The present invention relates to a resin composition for non-offsetting toners which are stable at low temperatures and are useful for xerographic printing methods.

2. Description of Related Arts

Typical image forming processes in xerographic methods and electrostatic printing methods include a development step, which includes uniformly charging a light-conducting insulation layer, exposing it to form an exposed portion, dispersing charges on the exposed portion to form an electric latent image, and applying charged fine toner powder to the latent image to visualize the image; an image transfer step, which includes transferring the visible image thus obtained onto a transfer material such as transfer paper; and a fixing step, which includes permanently fixing the transferred image onto the transfer material by heating or applying pressure. Therefore, toners and resins for toners must meet the various requirements therefor. More specifically, in the development step, toners and resins for toners must first retain a certain amount of charge with respect to an environment suitable for a copying machine, in order to apply the toner to the electric latent image (chargeability or electrifiability). Secondly, in the fixing step, toners have non-offsetting properties, that is, toners do not adhere to hot rolls in hot roll fixing methods, and at the same time have good fixing properties with respect to paper. Thirdly, toners must have anti-blocking properties, that is, toners retained in various devices such as copying machines and printers must not cause blocking.

Typical examples of resins conventionally used for toners include styrene/acrylic resins and polyesters. Toners containing styrene/acrylic resins are less susceptible to environmental effects when used and exhibit stable static properties (humidity resistance), but have poor fixing properties with respect to paper. On the other hand, toners containing polyesters have good fixing properties with respect to paper, but their humidity resistance is poor. When toners are adjusted so as to have good non-offsetting properties, one of the most important requirements for toners, both styrene/acrylic resins and polyesters exhibit poor fixing properties.

Under these circumstances, there is a keen demand for resins for toners which have the good performance of both styrene/acrylic resins and polyesters.

Heretofore, extensive investigations have been made into resins for toners containing both styrene/acrylic resins and polyesters, most of which investigations include the technique of mixing both types of materials with different SP values (solubility parameters) by uniformly dispersing them using an extruder, Bambury mixer or the like. However, it is difficult to obtain a resin having stable qualities exhibiting a stable mixed state, because both types of materials have not only different SP values but also different melt viscosities. Furthermore, conventional blends of copolymers or graft copolymers have poor humidity resistance, due to presence of a polyester component.

Therefore, there is still a keen demand for improved resins for toners.

SUMMARY OF THE INVENTION

Accordingly, the present inventors have made intensive investigations into resins with view to providing suitable resins for toners which stably retain the excellent performances of styrene/acrylic resins and polyesters.

It is an object of the present invention to provide a resin for toners for use in a xerographic method, electrostatic printing method, etc., which toners have fixing properties, a non-offsetting properties, anti-blocking properties, and a humidity resistance acceptable for use in the xerographic method, electrostatic printing method, etc. and have stable qualities.

The above described objects of the present invention can be achieved by the provision of a resin composition for toners, composed essentially of a suspension polymerizate of:

(a) 5 to 40% by weight per total polymer of a polyester comprising at least one aromatic diol component and at least one aliphatic diol component, and having a weight average molecular weight of 3,000 to 30,000, an acid value of 0.5 to 10 mgKOH/g, and an OH value of 10 to 60 mgKOH/g;

(b) 60 to 95% by weight per total polymer of a vinyl monomer; and (c) 0.1 to 1.0% by weight per total polymer of a divinyl monomer, wherein the suspension polymerizate has a glass transition temperature of 40° to 70° C., an acid value of 0.1 to 10 mgKOH/g, and a softening temperature of 100° to 160° C., and further by the provision of an above-described resin composition for toners in which the vinyl monomer (b) comprises 1 to 30% by weight based on the weight of the polyester (a) of a glycidyl methacrylate component.

The resin composition for toners according to the present invention has the excellent performance of both the styrene/acrylic resin and the polyester, stable qualities and is excellent in its non-offsetting properties, fixing properties at low temperatures, anti-blocking properties and humidity resistance.

The use of the resin composition for toners according to the present invention enables the stable high speed development of toner images, so that high speed operation of copying machines, laser beam printers or the like can be achieved.

DETAILED DESCRIPTION OF THE INVENTION

The polyester described in (a) above can be obtained by the condensation polymerization of at least one dibasic carboxylic acid component, at least one aromatic diol component and at least one aliphatic diol component.

Examples of the dibasic carboxylic acid component include maleic acid, fumaric acid, itaconic acid, cyclohexanedicarboxylic acid, terephthalic acid, adipic acid, sebacic acid, isophthalic acid, acid anhydrides thereof and/or lower esters thereof.

As the aromatic diol component, there can be cited, for example, bisphenol A, hydrogenated bisphenol A, polyoxypropylene-(n)-polyoxyethylene-(n')-2,2-bis(4-hydroxyphenyl)propane, polyoxypropylene-(n)-2,2-bis(4-hydroxyphenyl)propane, polyoxyethylene-(n)-hydroquinone wherein 2≦n, and n'≦6. Particularly preferred are polyoxypropylene-(2,4)-2,2-bis(4-hydroxyphenyl)propane, and polyoxyethylene-(2,4)-2,2-bis(4-hydroxyphenyl)propane.

Examples of the aliphatic diol component include: ethylene glycol, diethylene glycol, triethylene glycol, polyethylene glycol, propylene glycol, 1,1-butanediol, 1,3-butanediol, 1,4-butanediol, cyclohexanedimethanol, and neopentyl glycol. Particularly preferred are ethylene glycol, neopentyl glycol, and 1,4-butanediol.

Further, the use of at least one of the aforementioned aromatic diol components and at least one of the aliphatic diol components makes it possible to control the grindability and humidity resistance, as well as the glass transition temperature, of the polyester.

It is preferred to use the aforementioned polyester in an amount of 5 to 40% by weight, particularly 10 to 35% by weight. If the amount of the polyester is below 5% by weight, the fixing properties of the resulting toner are poor, while in the region exceeding 40% by weight, the resulting toner has poor non-offsetting properties. The polyester has a weight average molecular weight of preferably 3,000 to 30,000, particularly 4,000 to 250,000. In the region where the weight average molecular weight is below 3,000, the resulting toner has poor non-offsetting properties, while in the region of above 30,000, the resulting toner has poor fixing properties. Further, the polyester is preferably a linear polyester, since it must be soluble in the vinyl monomers sued.

The polyester used in the invention has an acid value of 0.5 to 10 mgKOH/g. The polyester within this region can react with the vinyl monomers described hereinbelow. If the acid value is below 0.5 mgKOH/g, it is difficult to obtain the polyester by condensation polymerization reaction. In the region where the acid value exceeds 10 mgKOH/g, the toner containing the polyester has a poor humidity resistance. Therefore, it is preferred that the polyester used in the present invention have an acid value of particularly 2 to 6 mgKOH/g.

Most importantly, the polyester used in the invention has an OH value of 10 to 60 mgKOH/g. When a polyester in this region is used, a good humidity resistance is obtained. In the region where the OH value of the polyester is above 60 mgKOH/g, the resulting toner has a poor humidity resistance, while it is difficult to obtain a polyester having an OH value of below 10 mgKOH/g by a condensation polymerization reaction. Therefore, the particularly preferred OH value of the polyester is in the region of 10 to 50 mgKOH/g.

Next, the vinyl monomer used as component (b) in the present invention can be roughly grouped into a styrene unit, an acrylic acid unit, an unsaturated dibasic acid unit, and the like.

As for the styrene unit, there can be cited, for example, styrene, o-methylstyrene, m-methylstyrene, p-methylstyrene, α-methylstyrene, p-ethylstyrene, 2,4-diemthylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, 3,4-dicyclostyrene, etc.

As for the acrylic acid unit, there can be cited, for example, methyl acrylate, ethyl acrylate, n-butyl acrylate, isobutyl acrylate, propyl acrylate, 2-ethylhexyl acrylate, stearyl acrylate, methyl methacrylate, ethyl methacrylate, propyl methacrylate, n-butyl methacrylate, isobutyl methacrylate, 2-ethylhexyl methacrylate, stearyl methacrylate, diethylaminoethyl methacrylate, diethylaminoethyl methacrylate, etc.

Examples of the unsaturated dibasic acid ester unit include dimethyl malate, diethyl malate, diisopropyl malate, dibutyl malate, 2-ethylhexyl malate, diallyl malate, dimethyl fumarate, diethyl fumarate, diisobutyl fumarate, diisopropyl fumarate, dibutyl fumarate, 2-ethylhexyl fumarate, diallyl fumarate, dimethyl itaconate, diethyl itaconate, diisopropyl itaconate, dibutyl itaconate, 2-ethylhexyl itaconate, diallyl itaconate, etc.

The amount of the vinyl monomer (b) used is preferably 60 to 90% by weight, particularly 65 to 90% by weight, based on the total polymer. If this amount is below 60% by weight, the resulting toner has poor non-offsetting properties, while in the region where the amount exceeds 95% by weight, the resulting toner has poor fixing properties.

Further, as for the divinyl monomer as the component (c), there can be cited, for example, divinylbenzene, ethylene glycol dimethacrylate, 1,3-butylene glycol dimethacrylate, neopentyl glycol dimethacrylate, etc. The amount of the aforementioned divinyl monomer (c) is preferably 0.1 to 1.0% by weight, particularly 0.2 to 0.8% by weight, based on the total polymer. In the region where this amount is below 0.1% by weight, the resulting toner has poor non-offsetting properties. On the contrary, in the region where this amount is above 1.0% by weight, the resulting toner has poor fixing properties.

Next, the amount of the glycidyl methacrylate component (d) is favorably 1 to 30% by weight, particularly 2 to 25% by weight, based on the total polymer. In the region where the amount of the glycidyl methacrylate component is above 30% by weight, the resin has an increased softening point and the resulting toner has poor fixing properties. On the contrary, in the region where this amount is below 1% by weight, the polyester component is dispersed in the styrene/acrylic component, but does not react therewith.

The resin composition for toners according to the present invention has a glass transition temperature of 40° to 70° C., an acid value of 0.1 to 10 mgKOH/g, and a softening temperature of 100° to 160° C. If the glass transition temperature of the resin composition is below 40° C., the resulting toner has poor anti-blocking properties, while if it is in the region of exceeding 70° C., the resulting toner has poor fixing properties. Next, if the resin has an acid value of below 0.1 mgKOH/g, the humidity resistance of the resulting toner is good, but it is difficult to produce such a resin. On the contrary, in the region where the acid value exceeds 10 mgKOH/g, the resulting toner has poor humidity resistance. The particularly preferred acid value is 1 to 7 mgKOH/g. Further, in the region where the softening temperature of the resin is below 100° C., the resulting toner has poor fixing properties. The particularly preferred softening temperature is 110° to 150° C.

The resin composition for toners according to the present invention can be produced by suspension polymerization. More specifically, the polyester resin is uniformly mixed and dissolved in the vinyl monomer and divinyl monomer. Then, the vinyl monomer and divinyl monomer containing the uniformly dispersed polyester are polymerized in the presence of an initiator and a dispersing agent, and as a result the resin composition for toners of the present invention can be obtained, in which the polyester is highly uniformly micro-dispersed therein. Furthermore, the suspension polymerization uses deionized water, and hence a problem arises as to the hydrolysis of the polyester used with water. Therefore, polymerization temperatures at which no hydrolysis of the polyester occurs must be selected. That is, the polymerization temperature is preferably below 150° C., at which the esterification reaction for ordinary polyesters is initiated.

The initiator used in the suspension polymerization in the present invention may be an ordinary oleophilic initiator, for example, benzoyl peroxide, 2,2'-azobisisobutyronitrile, 2,2'-azobis(2,4-dimethylvaleronitrile), orthochlorobenzoyl peroxide, etc.

The dispersing agent used in the present invention may be one usually used in suspension polymerization methods.

The transition temperature of the resin for toners according to the present invention refers to a temperature corresponding to a point at which a chart base line and a tangential line of an endothermal curve intersect near a glass transition point thereof obtained by measurement at a rate of temperature increase of 10° C./minute using a differential calorimeter. The acid value referred to above is obtained by titration with KOH in toluene as a solvent. The softening temperature is obtained by measurement of the temperature at which half the amount of 1 g of sample has flown out at a constant temperature increase rate of 3° C./minute under a load of 30 kg using a flow tester (CFT-500, manufactured by Shimazu Seisakusho) having a nozzle of 1.0 mm in diameter by 10 mm in length. The weight average molecular weight Mw is obtained by measurement using Gel Permeation Chromatograph GPCHCL-8020, manufactured by Toso, expressed in terms of polystyrene.

EXAMPLES

Hereafter, the present invention will be explained by way of examples. However, the invention should not be construed as being limited thereto.

Example 1

In a reaction vessel, a polyester composed of terephthalic acid, polyoxypropylene (2,4)-2,2-bis(4-hydroxyphenyl)propane, and ethylene glycol, styrene, n-butyl acrylate, n-butyl methacrylate, 1,3-butylene glycol dimethacrylate, and benzoyl peroxide in the proportions shown in Table 1, were changed and mixed. Then, 200 parts by weight of deionized water, 0.01 part by weight of sodium polyacrylate as a suspension-dispersion stabilizer, 0.05 part by weight of the suspension-dispersion stabilizer prepared as described below, and 1 part by weight of sodium sulfate were added to the resulting composition, and mixed.

Preparation of Dispersing Agent A

In a separable flask having an inner volume of 2 liters and equipped with a stirrer, a thermometer and gas introduction pipe, 900 g of deionized water, 25 g of methyl methacrylate, and 75 g of 3-sodium sulfopropyl methacrylate were changed. After purging the air inside the reaction system by blowing nitrogen gas thereinto for 30 minutes, the flask was heated from the outside thereof in a hot-water bath with stirring to elevate the inner temperature to 60° C., and then 0.5 g of ammonium persulfate was added. At the same temperature, the stirring was continued for another 3 hours to obtain a suspension-dispersion stabilizer composed of a polymer solution having a bluish white appearance and having a viscosity of 340 centipoises (25° C.) (solid content: about 10%).

Then, the reaction was performed for about 4 hours while continuing the stirring at 350 rpm and keeping the inner temperature at 85° C. under atmospheric pressure. Thereafter, the inner temperature was elevated to 100° C. and the monomers remaining in the reaction system were evaporated off at that temperature for about 1 hour, and the temperature of the reaction system was lowered to room temperature to terminate the reaction. The physical properties of the resins A to F thus obtained are shown in Table 1-1.

Next, the resins A to F were each melt-kneaded together with carbon black in a blend ratio of 95 parts by weight of resin to 5 parts by weight of carbon black using a twin-screw extruder. Then, the resulting resin composition was pulverized using a jet mill, and the particle diameter of the powder was adjusted using a classifier to obtain toners TA to TF.

Subsequently, fixing tests of the toners TA to TF were performed using a fixing tester which was variable with respect to temperature, roll speed, and roll pressure, under conditions of a roll pressure in terms of a nip width of 3 mm and a roll speed of 20 mm/sec. The fixing temperature range was indicated by the roll temperature at which the fixing ratio of paper and the toner just exceeded 90% and the temperature at which hot offsetting occurred. The fixing ratio was measured using a Macbeth reflection densitometer, and the fixing ratio was defined by the ratio between the density of the toner fixed onto the paper used and the density after peeling-off with adhesive tape. The results of the fixing tests are shown in Table 1-2.

As will be apparent from Table 1-2, the toners TA to TF each exhibited excellent fixing properties and excellent non-offsetting properties.

Next, the toners TA to TF were charged in respective sample bottles, each in an amount of 1 g, and the sample bottles were placed in a hot-air drier at 40° C., and left to stand therein for 50 hours. Thereafter, the anti-blocking properties of each toner were evaluated. The results obtained are shown in Table 1-2. As will be apparent from Table 1-2, each of the toners TA to TF exhibited good anti-blocking properties.

Further, the toners TA to TF were each premixed with a ferrite carrier for positive charging under conditions of a temperature of 20° C. and a humidity of 60° C., or a temperature of 35° C. and a humidity of 85%, and then mixed well using a ball mill, followed by measurement of static charge on the toners. As the charge tester, a Blow-off meter manufactured by Toshiba Chemical Co. was used. The results obtained are shown in Table 1-2.

As will be apparent from Table 1-2, the amounts of static charge on the toners TA to TF were less dependent on temperature and humidity, which shows that the toners exhibited excellent humidity resistance.

Comparative Example 1

The procedures in Example 1 were repeated under the same conditions, except that styrene, n-butyl acrylate, 1,3-butylene glycol dimethacrylate, and benzoyl peroxide were charged according to recipe shown in Table 2-1. The physical properties of the resins G to I obtained are shown in Table 2-1.

Next, the resins G to I were converted into toners similar to that of Example 1 to obtain toners TG to TI. As by methods in Example 1, fixing tests, evaluation of anti-blocking properties and measurement of the amount of static charge were performed on each toner. The results obtained are shown in Table 2-2.

As will be clear from Table 2-2, the toners TG to TI each exhibited a high fixing temperature, and thus were poor in fixing properties as compared with the toners A to F according to the invention.

Comparative Example 2

The same polyesters used in the resins A to C in Example 1 were converted in to toners under the same conditions as in Example 1 to obtain toners TJ to TL. The physical properties of the polyesters used are shown in Table 2-1.

Fixing tests, evaluation of anti-blocking properties and measurement of the amount of static charge were performed on the toners TJ to TL under the same conditions as in Example 1. The results obtained are shown in Table 2-2.

As will be apparent from Table 2-2, the toners TJ to TL exhibited good fixing properties but had poor non-offsetting properties. The amounts of static charge of the toners TJ to TL showed poor dependence on temperature and humidity, and were poorer than any toner described in Example 1. That is, the toners TJ to TL had poor humidity resistance. As for the anti-blocking properties, all the comparative toners were good.

Example 2

Resins were prepared under the same conditions as in Example 1, except that the starting composition was replaced by one composed of a polyester composed of terephthalic acid, isophthalic acid, neopentyl glycol and ethylene glycol, styrene, dibutyl fumarate, 1,3-butylene glycol dimethacrylate and benzoyl peroxide according to the recipe described in Table 3-1. The resins M and N obtained are resins in which polyester was micro-dispersed.

The resins M and N were converted into toners under the same conditions as in Example 1 to obtain toners TM and TN. Then, fixing tests, evaluation of anti-blocking properties and measurement of the amount of static charge were performed on the toners TM and TN under the same conditions as in Example 1. The results obtained are shown in Table 3-2. As will be apparent from Table 3-2, the toners TM and TN each exhibited a good performance.

Comparative Example 3

Resins O to S were prepared under the same conditions as in Example 1, except that the starting composition was replaced by one composed of a polyester having the same weight average molecular weight of 8,000 and an OH value of 35 mgKOH/g, styrene, n-butyl acrylate, acrylic acid, 1,3-butylene glycol dimethacrylate and benzoyl peroxide according to the recipe described in Table 4-1. The physical properties of the resins O to S obtained are shown in Table 4-1.

Then, the resins O to S were converted in to toners under the same conditions as in Example 1 to obtain toners TO to TS, and fixing tests, evaluation of anti-blocking properties and measurement of the amount of static charge were performed on the toners TO to TS under the same conditions as in Example 1. The results obtained are shown in Table 3-2.

The toner TO was excellent in fixing properties, non-offsetting properties and humidity resistance but poor in anti-blocking properties. The toner TP was excellent in fixing properties, non-offsetting properties and anti-blocking properties but poor in humidity resistance. The toner TQ was excellent in fixing properties, anti-blocking properties and humidity resistance but poor in non-offsetting properties. Then, the toner TR was excellent in the non-offsetting properties, anti-blocking properties and humidity resistance, but poor in fixing properties as well as in grindability upon pulverization of the toner, requiring a much longer time than the other toners tested. The toner TS was excellent in fixing properties, non-offsetting properties and anti-blocking properties but poor in humidity resistance.

Comparative Example 4

Resins T and U were prepared under the same conditions as in Example 1, except that the starting composition was replaced by one composed of a polyester having the same composition as the polyester used in Example 1 but having a weight average molecular weight of 2,000 and an OH value of 70 mgKOH/g, styrene, n-butyl acrylate, and 1,3-butylene glycol dimethacrylate according to the recipe described in Table 4-1. The physical properties of the resins T and U are shown in Table 4-1.

Then, the resins T and U were converted in to toners under the same conditions as in Example 1 to obtain toners TT and TU. Fixing tests, evaluation of anti-blocking properties and humidity resistance were performed on the toners TT and TU under the same conditions as in Example 1. The results obtained are shown in Table 4-2.

As will be apparent from Table 4-2, the toner TT was excellent in non-offsetting properties, anti-blocking properties and humidity resistance but it was poorer in the fixing properties when compared with the toners obtained in Example 1. The toner TU was excellent in non-offsetting properties, fixing properties, and anti-blocking properties but poor in humidity resistance.

Example 3

In a reaction vessel a polyester composed of terephthalic acid, polyoxypropylene (2,4)-2,2-bis(4-hydroxyphenyl)propane, and ethylene glycol, styrene, n-butyl acrylate, n-butyl methacrylate, 1,3-butylene glycol dimethacrylate, glycidyl methacrylate, and benzoyl peroxide was changed in the proportions shown in Table 1, and mixed. Then, 200 parts by weight of deionized water, 0.01 part by weight of sodium polyacrylate as a suspension-dispersion stabilizer, 0.05 part by weight of the suspension-dispersion stabilizer A, and 1 part by weight of sodium sulfate were added to the resulting composition, and mixed.

Then, the reaction was performed for about 4 hours, continually stirring at 350 rpm keeping and the inner temperature at 85° C. under atmospheric pressure. Thereafter, the inner temperature was elevated to 100° C. and the monomers remaining in the reaction system were evaporated off at that temperature for about 1 hour, followed by a decrease in the temperature of the reaction system down to room temperature to terminate the reaction. The physical properties of the resins GA to GG thus obtained are shown in Table 5-2.

Next, the resins GA to GG were each melt-kneaded together with carbon black in a blend ratio of 95 parts by weight of resin to 5 parts by weight of carbon black using a twin-screw extruder. Then, the resulting resin composition was pulverized using a jet mill, and the particle diameter of the powder was adjusted using a classifier to obtain toners TA to TF.

Subsequently, fixing tests of the toners TGA to TGG were performed using a fixing tester variable with respect to temperature, roll speed, and roll pressure, under conditions of a roll pressure in terms of a nip width of 3 mm and a roll speed of 20 mm/sec. The fixing temperature range was indicated by the roll temperature at which the fixing ratio of paper and the toner just exceeded 90% and the temperature at which hot offsetting occurred. The fixing ratio was measured using a Macbeth reflection densitometer, and the fixing ratio was defined by a ratio between the density of the toner fixed onto the paper used and the density after peeling-off with adhesive tape. The results of the fixing tests are shown in Table 5-2. As will be apparent from Table 5-2, the toners TGA to TGG each were excellent in fixing properties at low temperatures, and in non-offsetting properties.

Then, the toners TGA to TGG were placed in respective sample bottles, each in an amount of 1 g, and the sample bottles were placed in a hot-air drier at 40° C., and left to stand therein for 50 hours. Thereafter, the anti-blocking property of each toner was evaluated. The results obtained are shown in Table 5-2. As will be apparent from Table 5-2, each of the toners TGA to TGG exhibited good anti-blocking properties.

Further, the toners TGA to TGG were each premixed with ferrite carrier for positive charging, under conditions of a temperature of 20° C. and a humidity of 60° C., or a temperature of 35° C. and a humidity of 85%, and then mixed well using a ball mill, followed by the measurement of static charge on the toners. As the charge tester, a Blow-off meter manufactured by Toshiba Chemical Co. was used. The results obtained are shown in Table 5-2. As will be apparent from Table 5-2, the amounts of static charge on the toners TGA to TGG were less dependent on temperature and humidity, which shows that the toners exhibited excellent humidity resistance.

Example 4

Resins GH to GJ were prepared under the same conditions as in Example 1, except that the starting composition was replaced by one composed of a polyester composed of terephthalic acid, isophthalic acid, polyoxypropylene (2,4)-n-bis(4-hydroxyphenylpropane), neopentyl glycol and ethylene glycol, styrene, n-butyl acrylate, 1,3-butylene glycol dimethacrylate, divinylbenzene, benzoyl peroxide, and 2,2'-azobis-(2,4-dimethylvaleronitrile) according to the recipe described in Table 6-1. The physical properties of the resins GH to GJ obtained are are shown in Table 6-2.

The resins GH to GJ were converted into toners under the same conditions as in Example 1 to obtain toners TGH to TGJ. Then, fixing tests, evaluation of anti-blocking properties and measurement of the amount of static charge were performed on the toners TGH to TGJ under the same conditions as in Example 1. The results obtained are shown in Table 6-2. As will be apparent from Table 6-2, the toners TGH to TGJ each exhibited good toner characteristics.

Comparative Example 5

Resin GK was prepared under the same conditions as in Example 3, except that the starting composition was replaced by one composed of styrene, n-butyl acrylate, 1,3-butylene glycol dimethacrylate, glycidyl methacrylate and benzoyl peroxide, according to the recipe described in Table 7-1. The resin GK obtained was converted into a toner under the same conditions as in Example 3 to obtain toner TGK. Then, fixing tests, evaluation of anti-blocking properties and humidity resistance were performed on the toner TGK under the same conditions as in Example 3. The results obtained are shown in Table 7-2. As will be apparent from Table 7-2, the toner TGK was poorer in fixing properties than the toners obtained in Example 3.

Comparative Example 6

Resins GL and GM were prepared under the same conditions as in Example 1, except that the starting composition was replaced by one composed of a polyester composed of terephthalic acid, polyoxypropylene-(2,4)-2,2-bis(4-hydroxyphenyl)propane and having a weight average molecular weight of 7,000, an acid value of 6.0 mgKOH/g, and an OH value of 40 mgKOH/g, styrene, n-butyl acrylate, glycidyl methacrylate, and 1,3-butylene glycol dimethacrylate according to the recipe described in Table 4-1. The physical properties of the resins O to S obtained are shown in Table 7-1.

Then, the resins GL and GM were converted in to toners under the same conditions as in Example 1 to obtain toners TGL and TGM, and fixing tests, evaluation of anti-blocking properties and humidity resistance were performed on the toners TGL and TGM under the same conditions as in Example 1. The results obtained are shown in Table 7-2.

As will be apparent from Table 7-2, the toners TGL and TGM were poor in anti-blocking properties.

Comparative Example 7

Resin GN was prepared under the same conditions as in Example 1, except that the starting composition was replaced by one composed of a polyester composed of terephthalic acid, ethylene glycol, and neopentyl glycol and having a weight average molecular weight of 7500, an acid value of 4.0 mgKOH/g, and an OH value of 35 mgKOH/g, styrene, n-butyl acrylate, and 1,3-butylene glycol dimethacrylate according to the recipe described in Table 7-1.

Then, the resin GN was converted in to toners under the same conditions as in Example 1 to obtain toner TGN. The grindability of the toner TGN was poor upon production. Fixing tests, and evaluation of anti-blocking properties were performed on the toner TGN under the same conditions as in Example 1. The results obtained are shown in Table 7-2.

As will be apparent from Table 7-2, the toner TGN was poor in humidity resistance.

TABLE 1-1

| Example and Resin Type | Polyester Component (wt. part) | Vinyl Monomer (wt. part) | | | Divinyl Monomer (wt. part) | Benzoyl Peroxide (wt. part) |
|---|---|---|---|---|---|---|
| | | Styrene | n-Butyl Acrylate | n-Butyl Methacrylate | 2,3-Butylene Glycol Dimethacrylate | |

TABLE 1-1-continued

| | | | | | | |
|---|---|---|---|---|---|---|
| Example 1 | | | | | | |
| A | 30 | 55.61 | 13.90 | — | 0.49 | 2.1 |
| B | 30 | 55.95 | 13.94 | — | 0.31 | 2.1 |
| C | 30 | 55.81 | 13.95 | — | 0.24 | 2.1 |
| D | 20 | 63.92 | 15.93 | — | 0.35 | 2.4 |
| E | 10 | 71.68 | 17.92 | — | 0.40 | 2.7 |
| F | 20 | 55.76 | — | — | 0.35 | 2.4 |

| Example and Resin Type | Polyester*1) OH Value | Polyester*1) Weight Average Molecular Weight | Physical Properties of Resin Tg*2) (°C.) | Physical Properties of Resin Softening Temperature (°C.) | Physical Properties of Resin Acid Value (mgKOH/g) |
|---|---|---|---|---|---|
| Example 1 | | | | | |
| A | 15 | 25,000 | 62.0 | 152 | 1.6 |
| B | 35 | 8,000 | 60.5 | 135 | 1.6 |
| C | 50 | 4,000 | 58.0 | 110 | 3.6 |
| D | 35 | 8,000 | 63.7 | 139 | 1.8 |
| E | 35 | 8,000 | 65.1 | 143 | 1.7 |
| F | 35 | 8,000 | 68.5 | 138 | 1.7 |

Notes:
*1)OH Value of polyester: unit: mgKOH/g
*2)Tg: Glass transition temperature (°C.)

TABLE 1-2

| Example and Toner Type | Fixing Temperature Range (°C.) | Anti-Blocking Property*1) | Amount of Static Charge (μC/g) 20° C. × 60% | Amount of Static Charge (μC/g) 35° C. × 85% |
|---|---|---|---|---|
| Example 1 | | | | |
| TA | 160 to 230 | B | 9.5 | 7.5 |
| TB | 145 to 220 | B | 8.0 | 6.0 |
| TC | 120 to 200 | C | 7.0 | 5.5 |
| TD | 150 to 220 | B | 8.5 | 7.8 |
| TE | 155 to 220 | A | 11.0 | 10.0 |
| TF | 145 to 220 | A | 8.0 | 6.0 |

Note:
*1)Anti-blocking property Rating: A (Good) > B > C > D > E > F (Poor) A, B and C are in actuality acceptable.

TABLE 2-1

| Example and Resin Type | Polyester Component (wt. part) | Vinyl Monomer (wt. part) Styrene | Vinyl Monomer (wt. part) n-Butyl Acrylate | Divinyl Monomer (wt. part) 1,3-Butylene Glycol Di-methacrylate | Benzoyl Peroxide (wt. part) |
|---|---|---|---|---|---|
| Comparative Example 1 | | | | | |
| G | — | 79.44 | 19.86 | 0.70 | 3 |
| H | — | 79.65 | 19.91 | 0.44 | 3 |
| I | — | 79.73 | 19.93 | 0.34 | 3 |
| Comparative Example 2 | | | | | |
| J | 100 | — | — | — | — |
| K | 100 | — | — | — | — |
| L | 100 | — | — | — | |

| Example and Resin Type | Polyester*1) OH Value | Polyester*1) Weight Average Molecular Weight | Pysical Properties of Resin Tg*2) (°C.) | Pysical Properties of Resin Softening Temperature (°C.) | Pysical Properties of Resin Acid Value (mgKOH/g) |
|---|---|---|---|---|---|
| Comparative Example 1 | | | | | |
| G | — | — | 64.0 | 170 | 0.4 |
| H | — | — | 64.0 | 155 | 0.4 |
| I | — | — | 63.5 | 140 | 0.5 |
| Comparative Example 2 | | | | | |
| I | 15 | 25,000 | 63.0 | 140 | 1.0 |
| K | 35 | 8,000 | 57.5 | 117 | 3.3 |
| L | 50 | 4,000 | 43.2 | 97 | 4.5 |

Notes:
*1)OH Value of polyester: unit: mgKOH/g
*2)Tg: Glass transition temperature (°C.)

TABLE 2-2

| Example and Toner Type | Fixing Temperature Range (°C.) | Anti-Blocking Proeprty*1) | Amount of Static Charge (μC/g) 20° C. × 60% | 35° C. × 85% |
|---|---|---|---|---|
| Comparative Example 2 | | | | |
| TG | 195 to 240 | B | 12.5 | 11.5 |
| TH | 180 to 230 | B | 12.8 | 11.0 |
| TI | 165 to 220 | B | 13.0 | 11.0 |
| Comparative Example 2 | | | | |
| TJ | 150 to 155 | B | 8.0 | 1.0 |
| TK | 127 | C | 6.5 | 0.5 |
| TL | 100 | D | 6.0 | 0.5 |

Note:
*1)Anti-blocking property Rating: A (Good) > B > C > D > E > F (Poor) A, B and C are in actuality acceptable.

TABLE 3-1

| Example and Resin Type | Polyester Component (wt. part) | Vinyl Monomer (wt. part) Styrene | Dibutyl Fumarate | Divinyl Monomer (wt. part) 1,3-Butylene Glycol Dimethacrylate | Benzoyl Peroxide (wt. part) |
|---|---|---|---|---|---|
| Example 2 | | | | | |
| M | 20 | 63.72 | 15.93 | 0.35 | 2.4 |
| N | 20 | 55.76 | 23.90 | 0.35 | 2.4 |

| Example and Resin Type | Polyester*1) OH Value | Weight Average Molecular Weight | Physical Properties of Resin Tg*2) (°C.) | Softening Temperature (°C.) | Acid Value (mgKOH/g) |
|---|---|---|---|---|---|
| Example 2 | | | | | |
| M | 38 | 8,000 | 58 | 130 | 2.5 |
| N | 45 | 4,500 | 48 | 121 | 6.5 |

TABLE 3-2

| Example and Toner Type | Fixing Temperature Range (°C.) | Anti-Blocking Property*1) | Amount of Static Charge (μC/g) 20° C. × 60% | 35° C. × 85% |
|---|---|---|---|---|
| Example 2 | | | | |
| TM | 140 to 220 | C | 9.0 | 7.0 |
| TN | 130 to 220 | D | 10.5 | 8.0 |

Note:
*1)Anti-blocking property Rating: A (Good) >B > C > D > E > F (Poor) A, B and C are in actuality acceptable.

TABLE 4-1

| Example and Resin Type | Polyester Component (wt. part) | Vinyl Monomer (wt. part) Styrene | n-Butyl Acrylate | n-Butyl Methacrylate | Divinyl Monomer (wt. part) 1,3-Butylene Glycol Dimethacrylate | Benzoyl Peroxide (wt. part) |
|---|---|---|---|---|---|---|
| Comparative Example 3 | | | | | | |
| O | 30 | 41.81 | 27.88 | — | 0,31 | 2.1 |
| P | 50 | 39.75 | 9.94 | — | 0.31 | 1.5 |
| Q | 30 | 56 | 14 | — | — | 2.1 |
| R | 20 | 79.65 | — | — | 0.35 | 2.4 |
| S | 30 | 55.75 | — | 13.94 | 0.31 | 2.1 |
| Comparative Example 3 | | | | | | |
| T | 20 | 55.75 | 13.94 | — | 0.31 | 2.1 |
| U | 20 | 55.75 | 13.94 | — | 0.31 | 2.1 |

| Example and Resin Type | Polyester*1) OH Value | Weight Average Molecular Weight | Physical Properties of Resin Tg*2) (°C.) | Softening Temperature (°C.) | Acid Value (mgKOH/g) |
|---|---|---|---|---|---|
| Comparative Example 1 | | | | | |

TABLE 4-1-continued

| | | | | | |
|---|---|---|---|---|---|
| O | 35 | 8,000 | 38.0 | 105 | 1.6 |
| P | 35 | 8,000 | 60.5 | 110 | 2.1 |
| Q | 35 | 8,000 | 58.0 | 90 | 1.5 |
| R | 35 | 8,000 | 31.0 | 168 | 1.4 |
| S | 35 | 8,000 | 68.0 | 151 | 11.1 |
| Comparative Example 4 | | | | | |
| T | 35 | 40,000 | 65.1 | 162 | 1.5 |
| U | 35 | 3,000 | 41.0 | 110 | 8.5 |

TABLE 4-2

| Example and Toner Type | Fixing Temperature Range (°C.) | Anit-Blocking Property*1) | Amount of Static Charge (μC/g) 20° C. × 60% | 35° C. × 85% |
|---|---|---|---|---|
| Comparative Example 3 | | | | |
| TO | 110 to 210 | E | 9.3 | 7.0 |
| TP | 120 to 220 | D | 6.5 | 1.5 |
| TQ | 95 | C | 7.5 | 5.5 |
| TR | 178 to 230 | A | 4.0 | 3.5 |
| TS | 160 to 230 | A | 5.5 | 0.5 |
| Comparative Example 4 | | | | |
| TT | 172 to 230 | B | 7.8 | 6.8 |
| TU | 120 to 210 | D | 10.0 | 2.0 |

TABLE 5-1

| Example and Resin Type | Poly-ester Component (wt. part) | Vinyl Monomer (wt. part) Styrene | n-Butyl Acrylate | n-Butyl Methacrylate | Divinyl Monomer (wt. part) 1,3-Butylene Glycol Di-methacrylate |
|---|---|---|---|---|---|
| Example 3 | | | | | |
| GA | 20 | 63.72 | 15.93 | — | 0.35 |
| GB | 20 | 55.76 | — | 23.89 | 0.35 |
| GC | 30 | 55.75 | 13.94 | — | 0.31 |
| GD | 30 | 55.75 | 13.94 | — | 0.31 |
| GE | 20 | 55.76 | — | 23.89 | 0.25 |
| GF | 30 | 55.75 | 13.94 | — | 0.24 |
| GG | 30 | 55.75 | 13.94 | — | 0.31 |

| Example and Resin Type | Glycidyl Methacrylate (wt. part) | Benzoyl Peroxide (wt. part) | Physical Properties of Polyester Acid Value (mgKOH/g) | OH Value (mgKOH/g) | Weight Average Molecular Weight |
|---|---|---|---|---|---|
| Example 3 | | | | | |
| GA | 2.66 | 2.4 | 3.5 | 35 | 7,800 |
| GB | 2.66 | 2.4 | 3.5 | 35 | 7,800 |
| GC | 7.98 | 2.1 | 7.8 | 50 | 3,800 |
| GD | 1.33 | 2.1 | 1.2 | 15 | 24,900 |
| GE | 4.00 | 2.4 | 3.5 | 35 | 7,800 |
| GF | 6.00 | 2.1 | 3.5 | 35 | 7,800 |
| GG | 1.5 | 2.1 | 7.8 | 50 | 3,800 |

TABLE 5-2

| Example and Toner Type | Physical Properties of Resin Tg (°C.) | Softening Temperature (°C.) | Acid Value (mgKOH/g) | Characteristics of Toner Fixing Temperature Range (°C.) | Anti-Blocking Property*1) | Amount of Static Charge 20° C. × 60% | 35° × 85% |
|---|---|---|---|---|---|---|---|
| Example 3 | | | | | | | |
| TGA | 64.9 | 141 | 0.9 | 146 to 220 | B | 9.5 | 8.3 |
| TGB | 68.0 | 140 | 1.0 | 145 to 220 | A | 9.8 | 8.2 |
| TGC | 60.0 | 115 | 1.8 | 120 to 220 | B | 14.0 | 12.1 |
| TGD | 64.0 | 154 | 0.8 | 159 to 220 | B | 7.8 | 9.0 |
| TGE | 68.0 | 143 | 0.7 | 148 to 220 | A | 13.0 | 12.5 |
| TGF | 64.0 | 125 | 0.5 | 130 to 210 | B | 12.8 | 12.2 |
| TGG | 60.0 | 136 | 1.2 | 141 to 220 | B | 3.5 | 6.0 |

Note:
the same as in Table 1-2.

TABLE 6-1

| Example and Resin Type | Polyester Component (wt. part) | Vinyl Monomer (wt. part) Styrene | n-Butyl Acrylate | Divinyl Monomer (wt. part) 1,3-Butylene Glycol Dimethacrylate | Divinylbenzene |
|---|---|---|---|---|---|
| Example 4 | | | | | |
| GH | 30 | 55.75 | 13.94 | 0.31 | — |
| GI | 30 | 55.75 | 13.94 | — | 0.31 |
| GJ | 30 | 55.75 | 13.94 | — | 0.31 |

| Example and Resin Type | Glycidyl Methacrylate (wt. part) | Initiator (wt. part) Benzoyl Peroxide | Azo Compound*1) | Physical Properties of Polyester Acid Value (mgKOH/g) | OH Value (mgKOH/g) | Weight Average Molecular Weight |
|---|---|---|---|---|---|---|
| Example 4 | | | | | | |
| GH | 2.66 | 2.4 | 2.1 | 1.5 | 28 | 13,000 |
| GI | 2.66 | 2.4 | — | 1.5 | 28 | 13,000 |
| GJ | 7.98 | 2.1 | 2.1 | 1.5 | 28 | 13,000 |

Notes:
*1)2,2'-Azobis(2,4-dimethylvaleronitrile

TABLE 6-2

| Example and Toner Type | Physical Properties of Resin Tg (°C.) | Softening Temperature (°C.) | Acid Value (mgKOH/g) | Characteristics of Toner Fixing Temperature Range (°C.) | Anti-Blocking Property*1) | Amount of Static Charge (μC/g) 20° C. × 60% | 35° C. × 85% |
|---|---|---|---|---|---|---|---|
| Example 4 | | | | | | | |
| TGH | 58.5 | 132 | 0.5 | 140 to 220 | C | 8.0 | 6.7 |
| TGI | 63.0 | 140 | 0.8 | 150 to 220 | B | 7.8 | 6.5 |
| TGJ | 61.0 | 135 | 0.4 | 140 to 220 | B | 7.6 | 6.3 |

Note:
the same as in TABLE 1-2.

TABLE 7-1

| Example and Resin Type | Polyester Component (wt. part) | Vinyl Monomer (wt. part) Styrene | n-Butyl Acrylate | Divinyl Monomer (wt. part) 1,3-Butylene Glycol Dimethacrylate |
|---|---|---|---|---|
| Comparative Example 5 | | | | |
| GK | — | 79.65 | 19.91 | 0.44 |
| Comparative Example 6 | | | | |
| GL | 30 | 55.75 | 13.94 | 0.31 |
| GM | 30 | 55.75 | 13.94 | 0.24 |
| Comparative Example 9 | | | | |
| GN | 30 | 55.75 | 13.94 | 0.31 |

| Example and Resin Type | Glycidyl Methacrylate (wt. part) | Benzoyl Peroxide (wt. part) | Physical Properties of Polyester Acid Value (mgKOH/g) | OH Value (mgKOH/g) | Weight Average Molecular Weight |
|---|---|---|---|---|---|
| Comparative Example 5 | | | | | |
| TGK | 2.66 | 3.0 | — | — | — |
| Comparative Example 6 | | | | | |
| TGL | — | 2.1 | 6.0 | 40 | 7,000 |
| TGM | 6.00 | 2.1 | 6.0 | 40 | 7,000 |
| Comparative Example 7 | | | | | |
| TGN | — | 2.1 | 4.0 | 35 | 7,500 |

TABLE 7-2

| Example and Toner Type | Physical Properties of Resin | | | Characteristics of Toner | | | |
|---|---|---|---|---|---|---|---|
| | Tg (°C.) | Softening Temperature (°C.) | Acid Value (mgKOH/g) | Fixing Temperature Range (°C.) | Anti-Blocking Proeprty*1) | Amount of Static Charge 20° C. × 60% | Amount of Static Charge 35° C. × 85% |
| Comparative Example 5 | | | | | | | |
| TGK | 63.0 | 150 | 0.4 | 15 to 230 | B | 13.8 | 12.9 |
| Comparative Example 6 | | | | | | | |
| TGL | 39.0 | 125 | 1.5 | 135 to 220 | F | 8.0 | 6.0 |
| TGM | 39.5 | 125 | 1.4 | 130 to 210 | F | 12.8 | 12.2 |
| Comparative Example 7 | | | | | | | |
| TGN | 63.0 | 135 | 1.6 | 145 to 220 | B | 9.5 | 3.5 |

Note:
the same as in Table 1-2.

What is claimed is:

1. A resin composition for toners, said resin composition consisting essentially of a suspension polymerizate, said suspension polymerizate being obtained by suspension polymerization of:

b) a vinyl monomer, the amount thereof being 60–95% by weight of the total weight of said suspension polymerization product; and c) a divinyl monomer, the amount thereof being 0.1–10% of the total weight of said suspension polymerization product; in the presence of:

a) a saturated polyester, the amount thereof being 5–40% by weight of the total weight of said suspension polymerization product;

said saturated polyester being obtained by condensation polymerization of at least one dibasic carboxylic acid component, at least one aromatic diol component and at least one aliphatic diol component, and wherein the dibasic carboxylic acid component is a compound selected from the group consisting of cyclohexane dicarboxylic acid, terephthalic acid, adipic acid, sebacic acid, isophthalic acid, acid anhydrides thereof and lower esters thereof; the weight average molecular weight of said polyester being 3,000–30,000, the acid value of said polyester being 1.2–7.8 mg KOH/g, and a hydroxyl value of said polyester being 10–60 mg KOH/g;

said suspension polymerization, comprising:

1) uniformly mixing and dissolving said polyester in said vinyl monomer and said divinyl monomer, 2) polymerizing the vinyl monomer and the divinyl monomer;

said polyester being in a uniformly micro-dispersed state in said suspension polymerizate;

said suspension polymerizate having:

i) a glass transition temperature in the range of 40°–70° C., ii) an acid value of 0.1–10 mg KOH/g, and iii) a softening temperature of 100°–160° C.

2. The resin composition for toners as claimed in claim 1, wherein the vinyl monomer (b) comprises 1 to 30% by weight based on the weight of the polyester (a) of glycidyl methacrylate component.

3. The resin composition for toners as claimed in claim 1, wherein the aromatic diol component is a compound selected from the group consisting of bisphenol A, hydrogenated bisphenol A, polyoxypropylene-(n)-polyoxyethylene-(n')-2,2-bis(4-hydroxyphenyl)propane, polyoxypropylene-(n)-2,2-bis(4-hydroxyphenyl)-propane, and polyoxyethylene-(n)-hydroquinone, wherein $2 \geqq n$, and $n' \leqq 6$.

4. The resin composition for toners as claimed in claim 1, wherein the aromatic diol component is a compound selected from the group consisting of polyoxypropylene-(2,4)-2,2-bis(4-hydroxyphenyl)propane, and polyoxyethylene-(2,4)-2,2-bis(4-hydroxyphenyl)propane.

5. The resin composition for toners as claimed in claim 1, wherein the aliphatic diol component is a compound selected from the group consisting of ethylene glycol, diethylene glycol, triethylene glycol, polyethylene glycol, propylene glycol, 1,1-butanediol, 1,3-butanediol, 1,4-butanediol, cyclohexanedimethanol, and neopentyl glycol.

6. The resin composition for toners a claimed in claim 1, wherein the saturated polyester is a linear polyester.

7. The resin composition for toners as claimed in claim 1, wherein the saturated polyester has an acid value of 2 to 6 mgKOH/g.

8. The resin composition for toners as claimed in claim 1, wherein the saturated polyester has an OH value of 10 to 50 mgKOH/g.

9. The resin composition for toners as claimed in claim 1, wherein the styrene unit is a compound selected from the group consisting of styrene, o-methylstyrene, m-methylstyrene, p-methylstyrene, α-methylstyrene, p-ethylstyrene, 2,4-dimethylstyrene, p-n-butylstyrene, p-tertbutylstyrene, p-n-hexylstyrene, p-n-octylstyrene, p-n-nonylstyrene, p-n-decylstyrene, p-n-dodecylstyrene, p-methoxystyrene, p-phenylstyrene, and 3,4-dicyclostyrene.

10. The resin composition for toners as claimed in claim 1, wherein the acrylic acid unit is a compound selected from the group consisting of methyl acrylate, ethyl acrylate, n-butyl acrylate, isobutyl acrylate, propyl acrylate, 2-ethylhexyl acrylate, stearyl acrylate, methyl methacrylate, ethyl methacrylate, propyl methacrylate, n-butyl methacrylate, isobutyl methacrylate, 2-ethylhexyl methacrylate, stearyl methacrylate, diethylaminoethyl methacrylate, and diethylaminoethyl methacrylate.

11. The resin composition for toners as claimed in claim 1, wherein the divinyl monomer is a compound selected from the group consisting of divinylbenzene, ethylene glycol dimethacrylate, 1,3-butylene glycol dimethacrylate, and neopentyl glycol dimethacrylate.

12. The resin composition for toners as claimed in claim 1, wherein the amount of the divinyl monomer is 0.2 to 0.8% by weight per the total polymer.

13. The resin composition for toners as claimed in claim 2, wherein the amount of the glycidyl methacrylate component is 2 to 25% by weight per the total polyester.

14. The resin composition for toners as claimed in claim 1, wherein the suspension polymerizate has i) an acid value of 1 to 7 mgKOH/g, and ii) a softening temperature of 110° to 150° C.

15. The resin composition for toners as claimed in claim 1, wherein the suspension polymerizate is a polymer alloy of saturated polyester resin and styrene acrylic resin.

16. The resin composition for toners as claimed in claim 2, wherein the suspension polymerizate is a graft polymer of saturated polyester resin and styrene acrylic resin.

17. The resin composition for toners as claimed in claim 15, wherein the styrene acrylic resin is cross-linking styrene acrylic resin.

18. The resin composition for toners as claimed in claim 1, wherein the vinyl monomer is selected from the group consisting of styrene, acrylic acid, dimethyl maleate, diethyl maleate, diisopropyl maleate, dibutyl maleate, 2-ethylhexyl maleate, diallyl maleate, dimethyl fumarate, diethyl fumarate, diisobutyl fumarate, diisopropyl fumarate, dibutyl fumarate, 2-ethylhexyl fumarate, diallyl fumarate, dimethyl itaconate, diethyl itaconate, diisopropyl itaconate, dibutyl itaconate, 2-ethylhexyl itaconate and diallyl itaconate.

* * * * *

UNITED STATES PATENT AND TRADEMARK OFFICE

CERTIFICATE OF CORRECTION

PATENT NO. : 5,409,989

DATED : April 25, 1995

INVENTOR(S) : Hirokazu ITO, et al.

It is certified that error appears in the above-indentified patent and that said Letters Patent is hereby corrected as shown below:

On the title page, Item [75], the second inventor's name should read:

--Masahiro Itoh--

Signed and Sealed this

Eighteenth Day of July, 1995

Attest:

BRUCE LEHMAN

*Attesting Officer* *Commissioner of Patents and Trademarks*